United States Patent [19]

Druffel et al.

[11] Patent Number: 4,511,113

[45] Date of Patent: Apr. 16, 1985

[54] HANGAR DEVICE FOR A RECESSED LIGHTING UNIT

[75] Inventors: James B. Druffel; Joel S. Cohen, both of Oakland, Calif.

[73] Assignee: Prescolite, a division of U.S. Industries, San Leandro, Calif.

[21] Appl. No.: 351,877

[22] Filed: Apr. 8, 1982

Related U.S. Application Data

[63] Continuation-in-part of Ser. No. 222,042, Jan. 2, 1981, Pat. No. 4,388,677.

[51] Int. Cl.³ .............................................. F16M 1/00

[52] U.S. Cl. ..................................... 248/546; 248/57; 248/216.4; 248/343

[58] Field of Search ...................... 248/546, 57, 216.4, 248/217.2, 217.3, 342, 343; 362/365; 52/28, 39

[56] References Cited

U.S. PATENT DOCUMENTS

| | | | |
|---|---|---|---|
| 2,682,385 | 6/1954 | Schluter | 248/216.4 X |
| 3,104,087 | 9/1963 | Budnick et al. | 248/216.4 X |
| 3,214,126 | 10/1965 | Roos | 248/57 X |
| 3,518,421 | 6/1970 | Cogdill | 248/57 |
| 4,050,603 | 9/1977 | Harris | 248/57 X |
| 4,165,851 | 8/1979 | Bowden | 248/57 |
| 4,293,895 | 10/1981 | Kristofek | 362/365 X |
| 4,313,154 | 1/1982 | Capostagno et al. | 362/365 |
| 4,336,575 | 6/1982 | Gilman | 362/365X |
| 4,336,575 | 6/1982 | Gilman | 362/365 X |

*Primary Examiner*—J. Franklin Foss
*Attorney, Agent, or Firm*—Bielen and Peterson

[57] ABSTRACT

A hangar device for holding a recessed lighting fixture to a pair of beams utilizing a pair of elongated members movable in relation to one another. Each of the elongated members includes a shaft and an end piece angularly disposed in relation to the shaft. The end piece includes a lip fixed at an angle to the same and an end portion for fastening the pair of elongated members to each of the beams.

4 Claims, 9 Drawing Figures

HANGAR DEVICE FOR A RECESSED LIGHTING UNIT

CROSS REFERENCES TO RELATED INVENTIONS

The present application is a continuation-in-part of my patent application Ser. No. 222,042, filed Jan. 2, 1981, now U.S. Pat. No. 4,388,677.

BACKGROUND OF THE INVENTION

The present invention relates to a novel and useful recessed lighting unit.

Recessed lighting fixtures offer the advantage of being unobtrusive while functioning to illuminate areas with a variety of lighting effects. Recessed lighting equipment can be easily installed in new construction situations where supporting beams and wiring are accessible. Recessed lighting can also be installed in existing structures when desired.

Recessed lighting fixtures must also possess the ability to dissipate heat generated by its lamp. In addition, it is desirable to interrupt the source of the heat produced by the lamp, i.e. the electrical power, when excess heat is generated by the lamp.

It is also desirable to have recessed lighting fixtures which are easy to mount in a ceiling or wall and accessible for wiring, inspection, re-lamping and the like. The flexibility and appearance changes as a necessary element in recessed lighting systems.

A recessed lighting unit that solves these problems would be an advance in the lighting industry.

SUMMARY OF THE INVENTION

In accordance with the present invention a novel and useful recessed lighting unit is provided.

The recessed lighting unit of the present invention includes a housing having means for mounting the electrical lamp and socket. Such a housing would include an opening for the passage of light therethrough which emanates from the lamp therewithin. The housing would also have means for mounting the lamp and socket and for the accomodation of certain trims for determining the type of lighting effect desired.

The recessed lighting unit would also have means for providing electrical power to the lamp and socket within the housing. Such means might include a junction box of conventional configuration as well as electrical wires leading from the junction box to the housing. The unit of the present invention would also include thermal protector or thermoprotector means which would detect heat in the vicinity of the housing and interrupt the electrical power to the same if the temperature exceeded a certain preset value. The thermoprotector means would be mounted adjacent the housing and could include a container for the thermoprotector means. The container could be made of a rigid material and slidingly engage a slot in the housing. The container might form part of a structural unit with the housing and junction box. In addition, the container may include a tab which is capable of extending along a portion of the housing and adjacent to the same next to the slot. The tab may be resiliently fixed to the container to produce a spring effect which would ease the assembly of the housing, junction box, and container forming the structural unit.

The recessed lighting unit may also have a door which is hingedly attached to the housing at one end portion and latched to the housing at another end portion. The latching means may include providing the housing with an opening through the same and connecting a spring element to the door in a projecting configuration. The spring element may include a bent portion which is capable of occupying the opening through the housing. Thus, the latching mechanism would be accessible and operable from inside and outside the housing.

The recessed lighting unit also includes a hangar mechanism which is useable relative to a pair of beams. The mechanism may embrace a pair of elongated members movable in relation to one another. Means would be provided for supporting the pair of elongated members to the housing without impairment of the relative movement between the elongated members. Each of the elongated members would include a shaft and an end portion having an end piece fixed at an angle to the shaft. A lip would also be fixed to the end piece at an angle to the same. Means would be provided for fastening each of the elongated members to each of the beams. Such means for fastening the elongated members to the beams may include forming the end piece as a split member having a first and second portion. The first portion of the split member could be bent into a first and second section such that the first section has an end portion capable of penetrating any of the beams. In addition, the end piece could include an opening therethrough to accommodate a fastener, such as a nail, screw, and the like.

The recessed lighting unit may also include a hanger mechanism end portion which includes a pair of tines, each adopted for penetration of any of the beams. Each tine of the pair of tines may include an angular surface which tends to spread the tines from one another upon penetration of any of the beams. Thus, removal of the tines would be quite difficult after placement.

It may be apparent that a novel and useful recessed lighting unit has been described.

It is therefore an object of the present invention to provide a recessed lighting unit which includes a protection mechanism against overheating due to the dissipation of heat from a lamp which will only interrupt the flow of power to the lamp under conditions where an abnormal amount of heat is generated by the lamp.

It is another object of the present invention to provide a recessed lighting unit which includes a mechanism for interrupting the flow of power to the lamp which forms parts of the structural framework for the recessed lighting unit.

It is yet another object of the present invention to provide a recessed lighting unit which may be easily and inexpensively manufactured and assembled.

It is another object of the present invention to provide a recessed lighting unit which permits access to the same for the purposes of re-lamping, replacement of trim components, inspection of junction box wiring, and the like.

It is another object of the present invention to provide a recessed lighting unit which may be easily mounted between a pair of beams in a uniform manner.

The invention possesses other objects and advantages especially as concerns particular characteristics and features thereof, which will become apparent as the specification continues.

For a better understanding of the invention, reference is made to the following detailed description which should be referenced to the hereinabove described drawings.

DESCRIPTION OF THE PREFERRED EMBODIMENTS

Various aspects of the present invention will evolve from the following detailed description of the preferred embodiments thereof which should be taken in conjunction with the hereinabove described drawings.

Figure 2:
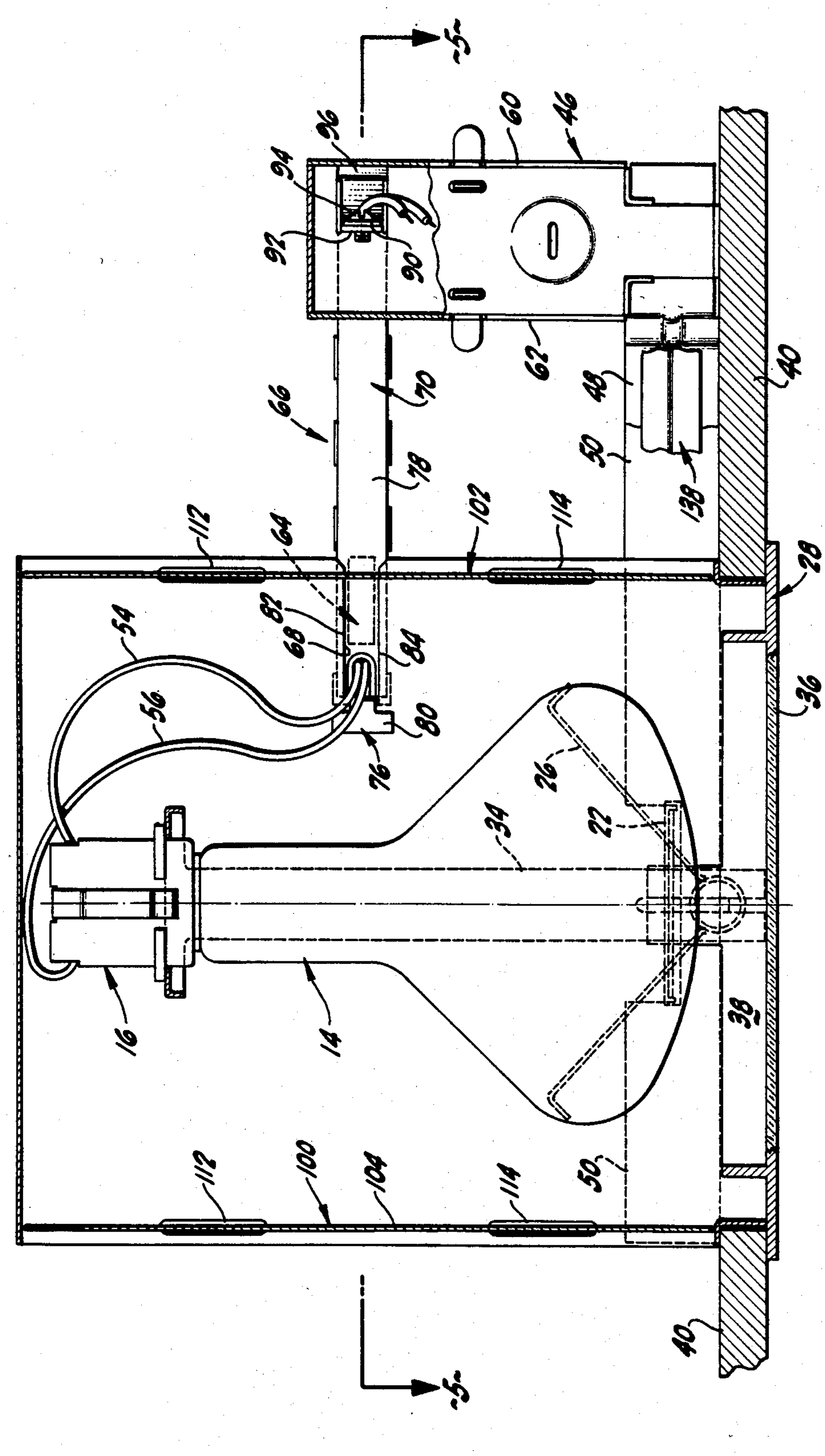
FIG. 2 is a sectional view taken along line 2—2 of FIG. 1.
Figure 3:
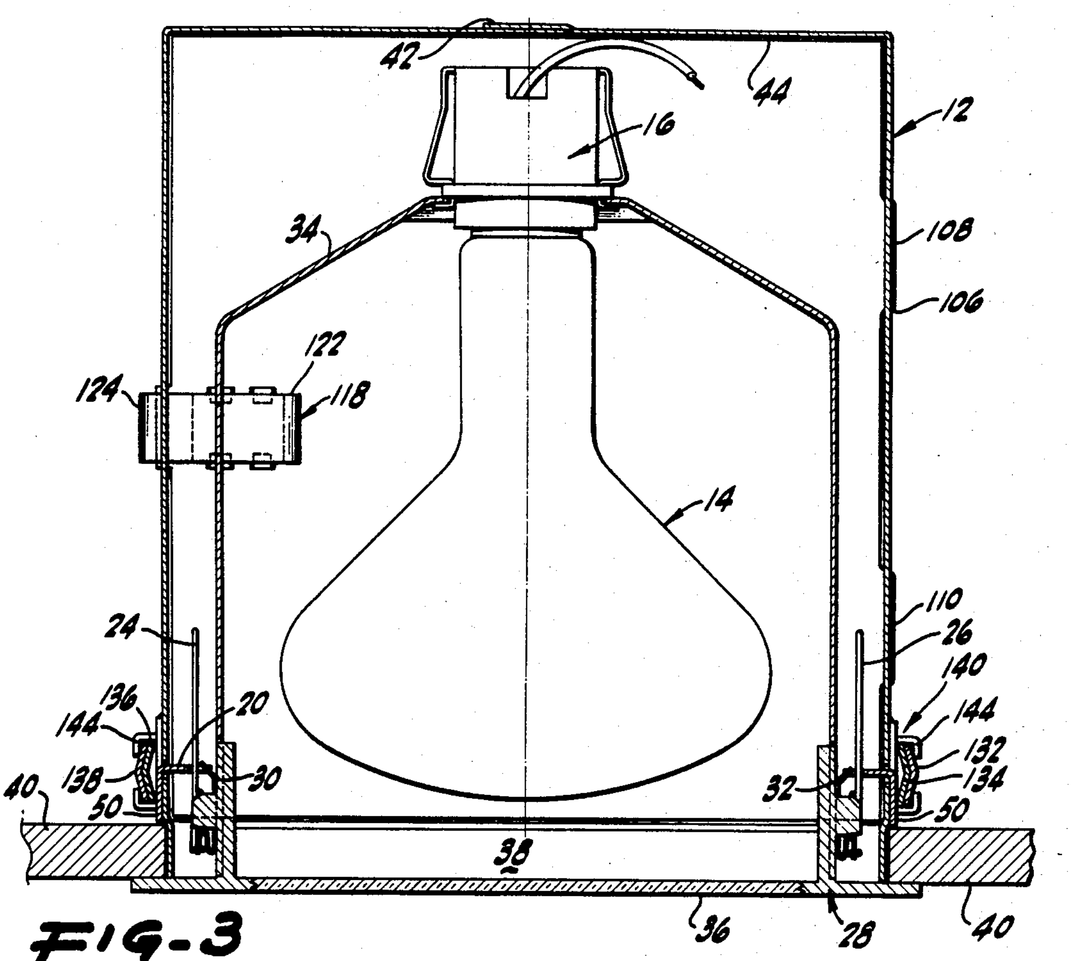
FIG. 3 is a sectional view taken along line 3—3 of FIG. 1.
Figure 4:
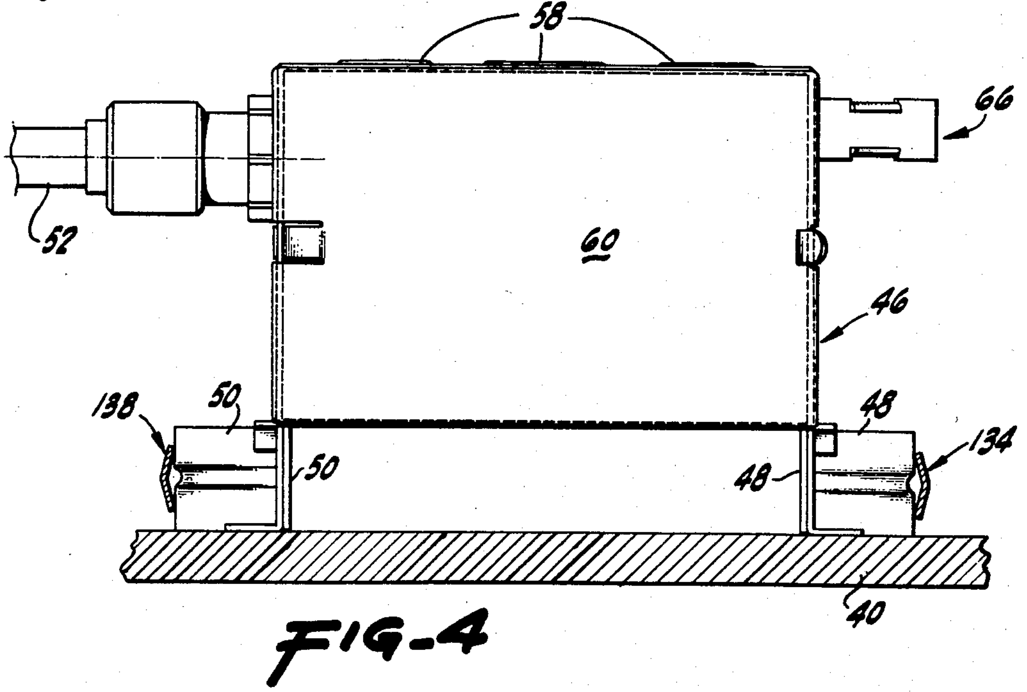
FIG. 4 is a sectional view taken along line 4—4 of FIG. 1.
Figure 5:
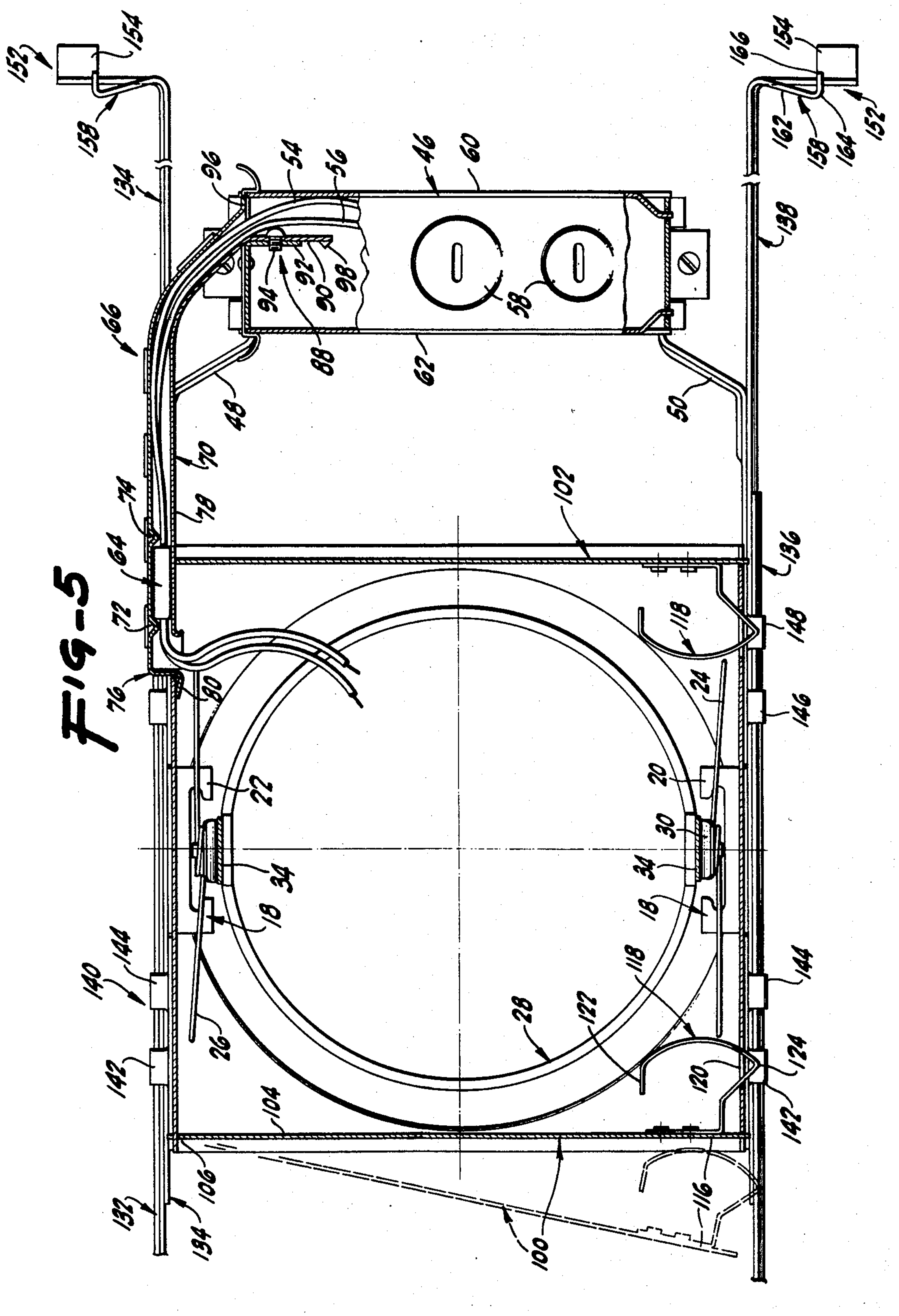
FIG. 5 is a sectional view taken along line 5—5 of FIG. 2.

The invention as a whole is represented in the drawings by reference character 10. The recessed lighting unit 10 includes as one of its elements a housing 12, FIGS. 1–5. Housing 12 may be formed into the rectangular solid configuration shown in the drawings using progressive die manufacturing techniques. Housing 12 may be constructed of metal or any other material which meets the particular standards set by the electrical authority. With reference to FIGS. 2 and 3, it may be seen that housing 12 encloses an electrical lamp 14 and socket 16 therefor. Means 18 mounts electrical lamp 14 and socket 16 to housing 12. Means 18 includes a pair of brackets 20 and 22, FIG. 5, which enclose torsion springs 24 and 26, respectively. Torsion springs 24 and 26 are held to base 28 by the use of fastening clips 30 and 32, FIGS. 3 and 5. A yoke 34 aids in the support of the socket 16 and lamp 14. A lens 36 removably fixes to base 28 and generally coincides with opening 38 and housing 12 which is intended to allow the passage of light emanating from lamp 14 to the area below which is to be illuminated. As shown in the drawings, housing 12 is recessed in relation to partition 40 which may be a ceiling, wall, and the like. Housing 12 also includes a locking seam 42 on the top portion 44 thereof.

Housing 12 structurally connects to junction box 46 via arms 48 and 50. Junction box 46 may include provision for cable 52 which provides electrical power from a source of power shown by the indicia on FIG. 1. The wires bringing power from the source are spliced in the conventional manner in junction box 46 and carried to housing 12 and lamp and socket 14 and 16 therein via wires 54 and 56. Junction box 46 may also have a plurality of knockout covers 58 and a pair of side covers 60 and 62, FIGS. 1, 2, and 4. Unit 10 also includes as one of its elements thermoprotector means 64 for detecting heat in the vicinity of housing 12 and interrupting electrical power from the power source falling through wires 54 and 56. Thermoprotector means 64 would perform its function at a selected temperature produced by heat radiating from lamp 14 within housing 12. Thermoprotector 64 may take the form of a bimetal strip such as the Model No. M-13D manufactured by Portage Electric of Akron, Ohio. Means 66 mounts thermo protector means 64 adjacent to housing 12. As may be seen from FIGS. 1, 2 and 5, housing 12 is provided with slot 68 on one side thereof. A container or wireway 70 guides wires 54 and 56 from junction box 46 to the interior of housing 12. Wireway 70 also encloses thermoprotector means 64 and positions the same adjacent housing 12 by the use of protrusions 72 and 74, FIG. 5. Thus, thermoprotector means 64 is always positioned in the same place in relation to housing 12 which is of great importance to reproduce shut-off results in unit 10. Wireway 70 also includes an element 76 which slidingly engages housing 12 in the vicinity of slot 68. Side portions 78 of wireway 70 and tab 80 of element 76 sandwich the edges 82 and 84 of housing 12 surrounding slot 68. It should be noted that tab 80 may extend beyond the end of slot 86 toward lamp 14. Thus, wireway 70 may be moved away from lamp 16 a certain distance such that tab 80 covers slot 68, FIG. 2. Wireway 70 also includes means 88 for connecting wireway 70 to junction box 46. Such means includes the provision of an extension 90 which may be fastened to plate 92 using fastening means 94, FIG. 5. Flange 96 overlaps the end of junction box 46 to enclose wires 54 and 56 at the conflux of junction box and wireway 70. Extension 90 may also be used to provide a place of attachment 98 for a ground wire (not shown), if desired. It may be apparent that the sliding engagement of element 76 of wireway 70 in combination with means 88 for connecting wireway 70 to junction box 46 provides a structural unit in combination with arms 48 and 50. The sliding engagement of tab 80 with the side portion of housing 12 allows for size tolerances in wireway 70 as well as for thermal contraction and expansion of the elements of unit 10. Element 76 and tab 80 thereof may also be resiliently attached to wireway 70 to provide a flexible or springy connection between wireway 70 and housing 12. Tab 80 also conducts heat from interior of housing 12 for detection by thermoprotector means 64.

Housing 12 also embraces the structure of door 100 which is similarly constructed in relation to door 102. Therefore, the following description of door 100 would equally apply to the construction of door 102. Door 100 includes a member 104 in the form of a plate in the embodiment shown on FIG. 5. Member 104 hingedly attaches to housing 12 at end portion 106. This may be accomplished by providing end portion 106 with a pair of ears 108 and 110 which fit in a pair of openings 112 and 114, respectively, FIG. 2. The other end 116 of member 104 includes means 118 for latching door 100 to housing 12. Means 118 may include providing housing 12 with an opening 120 therethrough. A spring element 122 is fastened to door 100 and projects therefrom. Spring element 122 may include a vent or looped portion 124 which is capable of occupying opening 120 of housing 12. It may be apparent that door 100 may be opened by applying pressure to spring element 122 from the outside of housing 12. This may be especially useful after unit 10 has been placed in ceiling 40 to gain access to the area surrounding housing 12, FIG. 5. Doors 100 or 102 may be temporarily brought to the inside of housing 12 while work is being performed on junction box 46.

In addition, unit 10 may also provide for a hangar mechanism 126 which may be employed in relation to a pair of beams 128 and 130. Hangar mechanism 126 may include a pair of elongated members 132 and 134 and a pair of elongated members 136 and 138. The following description will focus on the functioning of elongated members 132 and 134 of hangar mechanism 126 and may be deemed to be applicable to the functioning of elongated members 136 and 138, which are similarly constructed.

Figures 1, 6:
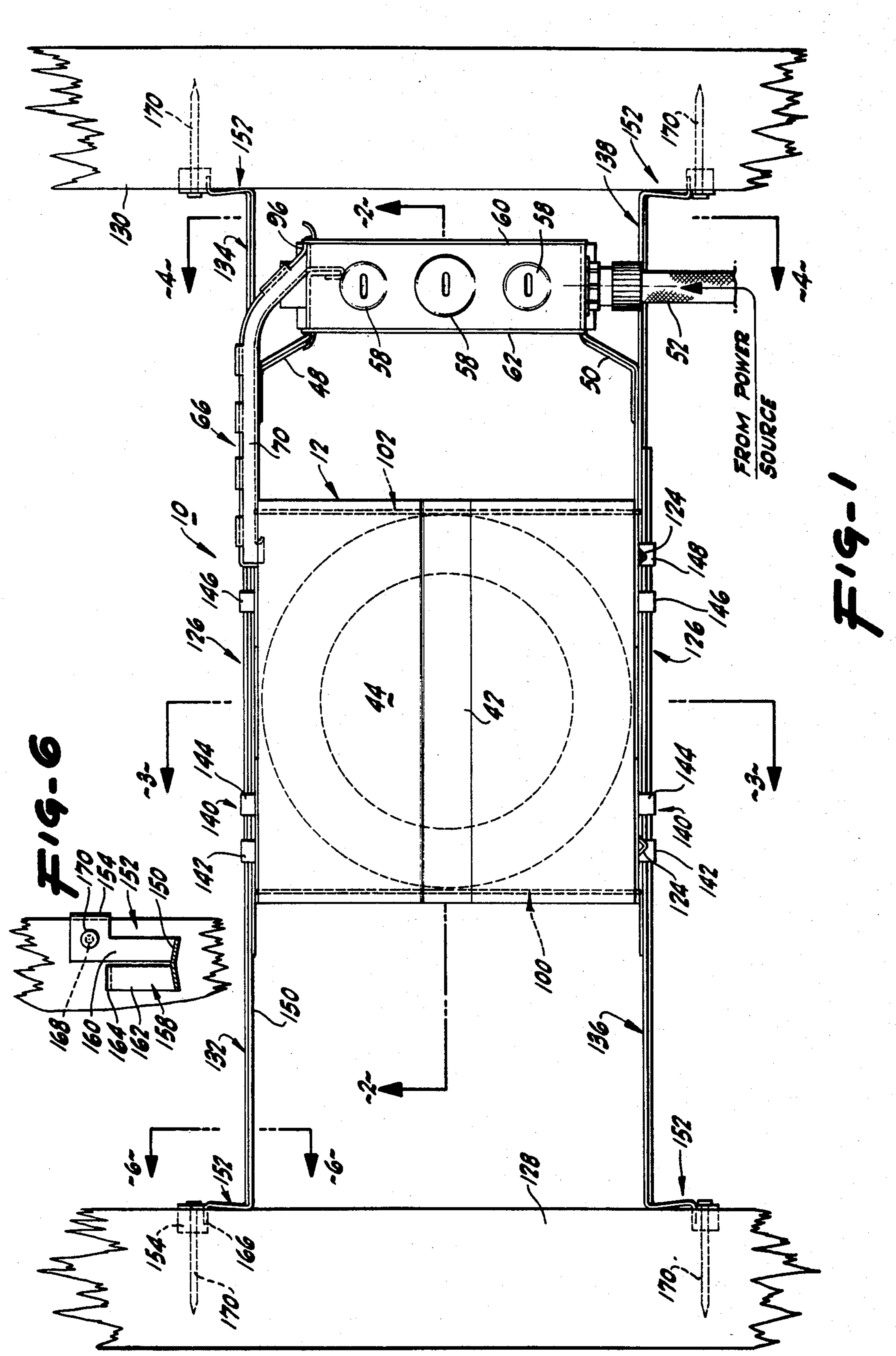
FIG. 1 is a top plan view of the unit.
FIG. 6 is a sectional view taken along line 6—6 of FIG. 1.

Turning to FIG. 1, it may be seen that elongated members 132 and 134 are used in conjunction with means 140 for supporting the pair of elongated members to housing 12. Cleats 142, 144, 146, and 148 serve to confine elongated members 132 and 134 in sliding engagement with one another adjacent housing 12. As shown in FIG. 1, member 132 extends to beam 128 while elongated member 134 extends to beam 130. Each elongated member is identically constructed, using elongated member 132 as an exemplar, to include a shaft 150 in the form of a bar having two portions angularly attached to one another (most clearly shown on FIG. 4 in relation to elongated members 134 and 138). By this construction, the pairs of elongated members slide in relation to one another and are guided in this movement, FIG. 3. The end portion of elongated member 132 includes an end piece 152 fixed at an angle to shaft 150. Moreover, a lip 154 fixes at an angle to end piece 152, FIGS. 1 and 6. Elongated members, such as elongated member 132, also includes means 156 for fastening the same to beams 128 and 130. Means 156 may be formed such that end piece 152 is a split member having a first and second portion 158 and 160. First portion may be bent into a first and second section 162 and 164. First section 162 of first portion 158 may include an end portion 166, FIG. 1, which is capable of penetrating any of the beams 128 and 130. End piece 152 may include an opening 168 for guiding a fastener, such as nail 170 into beam 128.

Figure 7:
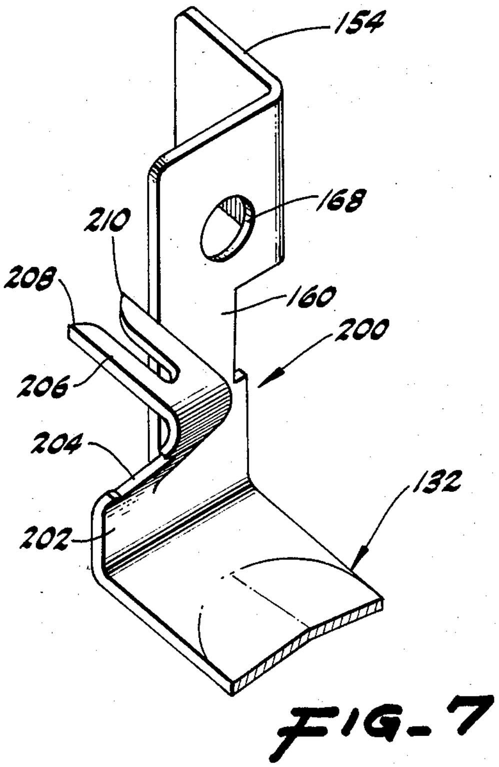
FIG. 7 is a perspective view of an end portion of one of the bar hangars.
Figure 8A:
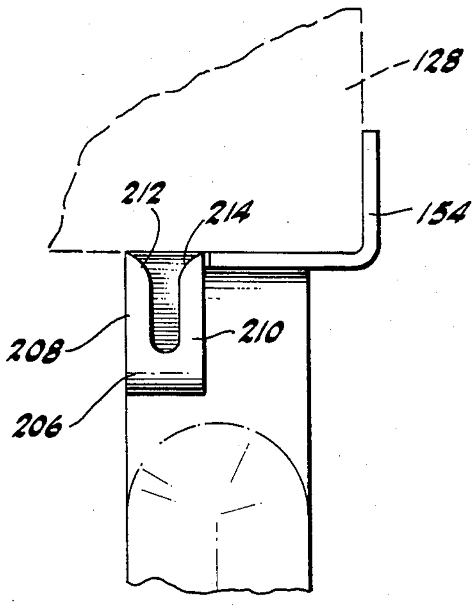
FIG. 8A is a top plan view of the end portion of the bar hangar of FIG. 7 before penetration of a beam.
Figure 8B:
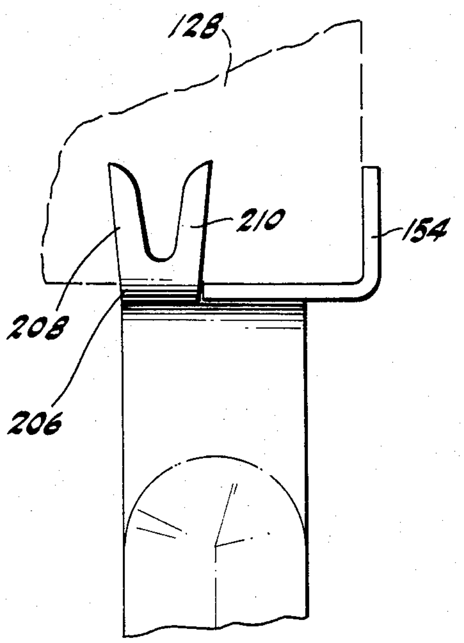
FIG. 8B is a top plan view of the end portion of the bar hangar of FIG. 7 after penetration of a beam.

Means 156 may also take the form of an end piece 200, FIG. 7. As may be seen from FIG. 7, end piece 200 includes a first portion 202 and a second portion 160 which is identical to second portion 160 of end piece 152, FIG. 6. Second portion 160 embraces opening 168 and lip 154. First portion 202 has a first section 204 and a second section 206. Second section 206 is composed of a pair of tines 208 and 210 being capable of penetration within beam 128, FIGS. 8A and 8B. Each tine 208 and 210 also is constructed with cam surfaces 212 and 214 which tends to spread tines 208 and 210 from one another upon penetration of beam 128, FIG. 8B.

In operation, unit 10 might be assembled by placing wires 54 and 56 through wireway 70 in connecting socket 16 at one end thereof. Wireway 70 is then connected to housing 12 by the use of means 66 and in the embodiment shown in the drawings, element 76 slidingly engaging the sides of slot 68 of housing 12. The other end of wireway 70 would be affixed to junction box 46 by the use of fastener 94 which would connect extension 90 and plate 92 in adjacent configuration. Unit 10 may then be placed between beams 128 and 130 using hanger mechanism 126 such that the lip 154 of end piece 152 of elongated member 132 and similar lips of elongated members 134, 136, and 138, fit under beams 128 and 130. This accurately positions unit 10 as a recessed lighting fixture. Power can then be brought to junction box 45 via cable 52 and splice to wires 54 and 56 in the conventional manner. Side covers 60 and 62 may then be employed to enclose junction box 46. Likewise, doors 100 and 102 may be used to close housing 12 leaving opening 38 as the only opening of housing 12. Socket 16 may then be fastened to housing 12 using means 18, which includes the provision of placing torsion springs 24 and 26 in mounting brackets 20 and 22 after fastening the same to base 28 by the employment of fastening clips 30 and 32. Yoke 34 may also be employed by fastening the same to base 28. Lamp 14 may then be placed in socket 16 and lens 36 fastened to base 28 to complete the mounting of unit 10. Removal of lens 36 permits the changing of lamp 14 as desired. Doors 100 and 102 may be opened to gain access to the space immediately adjacent an outside of housing 12 including junction box 46.

While in the foregoing specification embodiments of the invention have been set forth in considerable detail for the purposes of making a complete disclosure of the invention, it will be apparent to those of ordinary skill in the art that numerous changes may be made in such details without departing from the spirit and principles of the invention.

What is claimed is:

1. A hanger device for holding a body to a pair of beams comprising:
   a. a pair of elongated members slidable in relation to one another, each of said pair of elongated members including a shaft having side portions, and means for fastening each of said pair of elongated members to each of the beams said means including at least one of said elongated members including an end portion having an end piece fixed at an angle to said shaft, said end piece further including a split member having a first and a second portion in side-by-side relationship; said first portion of said split member including first and second sections said first section including an end portion being capable of penetrating any of the beams, and
   b. a lip fixed to said second portion of said split member laterally beyond said side portions of said shafts of elongated members, and fixed at an angle in relation to said first portion of said end piece.

2. The hangar device of claim 1 in which said second section of said end portion of at least one of said pair of elongated members comprises a pair of tines each being adapted for penetration of any of the beams.

3. The hangar device of claim 2 in which each tine of said pair of tines includes a cam surface which tends to spread each tine from one another upon penetration of any of the beams.

4. The hangar device of claim 3 in which each of said shafts include a pair of bars angularly fixed to one another such that each shaft nests within the other shaft in sliding engagement.

* * * * *